US 12,406,204 B1

(12) United States Patent
Raikin et al.

(10) Patent No.: US 12,406,204 B1
(45) Date of Patent: Sep. 2, 2025

(54) MACHINE LEARNING WITH VARIABLE-SHAPE TENSORS

(71) Applicant: Habana Labs Ltd., Caesarea (IL)

(72) Inventors: Shlomo Raikin, Kibbutz Yassur (IL); Eyal Radiano, Tel Aviv (IL); Doron Singer, Tel Aviv (IL); Oren Kaidar, Binyamina-Givat Ada (IL)

(73) Assignee: Habana Labs Ltd., Caesarea (IL)

( * ) Notice: Subject to any disclaimer, the term of this patent is extended or adjusted under 35 U.S.C. 154(b) by 1033 days.

(21) Appl. No.: 17/467,216

(22) Filed: Sep. 5, 2021

(51) Int. Cl.
*G06N 20/00* (2019.01)

(52) U.S. Cl.
CPC .................. *G06N 20/00* (2019.01)

(58) Field of Classification Search
CPC ........................................ G06N 20/00
See application file for complete search history.

(56) References Cited

U.S. PATENT DOCUMENTS

| | | | |
|---|---|---|---|
| 11,847,491 B1* | 12/2023 | Kaidar | G06F 9/505 |
| 2016/0217368 A1 | 7/2016 | Ioffe et al. | |
| 2019/0042529 A1* | 2/2019 | Nurvitadhi | G06F 15/7867 |
| 2019/0205787 A1* | 7/2019 | Duriseti | G06F 16/901 |
| 2020/0320367 A1 | 10/2020 | Norman | |
| 2021/0064987 A1* | 3/2021 | Springer | G06N 3/08 |
| 2022/0092247 A1* | 3/2022 | Koeplinger | G06F 8/443 |
| 2024/0338558 A1* | 10/2024 | Ling | G06N 3/08 |

FOREIGN PATENT DOCUMENTS

| | | | | |
|---|---|---|---|---|
| CN | 111563418 A | * | 8/2020 | |
| CN | 111580826 A | * | 8/2020 | G06F 8/443 |
| CN | 111580827 A | | 8/2020 | |
| EP | 4455862 A1 | * | 10/2024 | G06F 8/41 |
| TW | 202127326 A | * | 7/2021 | G06F 12/0207 |

OTHER PUBLICATIONS

Choi et al., "Data-free Network Quantization with Adversarial Knowledge Distillation," arXiv:2005.04136v1, pp. 1-11, May 8, 2020.
U.S. Appl. No. 18/353,128 Office Action dated Aug. 22, 2024.
U.S. Appl. No. 17/088,625 Office Action dated Jun. 4, 2024.

* cited by examiner

*Primary Examiner* — Mariela Reyes
*Assistant Examiner* — Dylan E Varga
(74) *Attorney, Agent, or Firm* — Meitar Patents Ltd.; Daniel Kligler

(57) ABSTRACT

An apparatus includes a memory and one or more processors. The memory is configured to store tensors for Machine Learning (ML) processing. The one or more processors are configured to receive a work plan associated with a subgraph of a ML graph of a ML model, the work plan supports processing of tensors having respective shapes in a selected range of shapes. A shape of a tensor specifies respective sizes of dimensions of that tensor. The one or more processors are further configured to receive from the memory an input tensor having an actual shape, to modify the work plan based on the actual shape to produce a modified work plan for processing the input tensor in accordance with the subgraph, and to process the input tensor in accordance with the subgraph by submitting the modified work plan for execution by one or more of the processors.

22 Claims, 8 Drawing Sheets

MACHINE LEARNING WITH VARIABLE-SHAPE TENSORS

TECHNICAL FIELD

Embodiments described herein relate generally to machine learning, and particularly to methods and systems for machine learning with tensors having variable-size shapes.

BACKGROUND

Machine Learning (ML) methods involve computational methods that build models based on sample data. The trained model can be used in processing unseen data.

Machine learning methods are known in the art. For example, U.S. Patent Application Publication 2019/0042529 describes methods and systems for dynamically reconfiguring a deep learning processor by operating the deep learning processor using a first configuration. The deep learning processor then tracks one or more parameters of a deep learning program executed using the deep learning processor in the first configuration. The deep learning processor then reconfigures itself to a second configuration to enhance efficiency of the deep learning processor executing the deep learning program based at least in part on the one or more parameters.

SUMMARY

An embodiment that is described herein provides an apparatus that includes a memory and one or more processors. The memory is configured to store tensors for Machine Learning (ML) processing. The one or more processors are configured to receive a work plan associated with a subgraph of a ML graph of a ML model, the work plan supporting processing of tensors having respective shapes in a selected range of shapes. A shape of a tensor specifies respective sizes of dimensions of that tensor. The one or more processors are further configured to receive an input tensor that was stored in the memory, the input tensor having an actual shape, to modify the work plan based on the actual shape to produce a modified work plan for processing the input tensor in accordance with the subgraph, and to process the input tensor in accordance with the subgraph by submitting the modified work plan for execution by one or more of the processors.

In some embodiments, the one or more processors are configured to receive multiple input tensors for processing using the work plan in a common processing cycle, the input tensors belonging to respective ranges of shapes, to modify the work plan based on actual shapes of the respective input tensors for producing the modified work plan, and to processes the multiple input tensors in the common processing cycle using the modified work plan. In other embodiments, the actual shape depends on a non-inferable tensor operation in a previously executed subgraph, the non-inferable tensor operation generates a tensor whose shape depends on actual data in one or more tensors input to the non-inferable tensor operation. In yet other embodiments, the subgraph includes one or more tensor operations, and the one or more processors are configured to produce the modified work plan by modifying a tensor operation in the subgraph that receives as input variable-shape tensors, so as to operate on an input tensor having the actual shape.

In an embodiment, one of the processors includes a ML computational engine that is assigned to execute at least part of the modified work plan. In another embodiment, the one or more processors are configured to determine the selected range of shapes based on shapes of tensors received over multiple iterations of processing the subgraph. In yet another embodiment, the one or more processors include at least a Central Processing Unit (CPU) and a ML computational engine, and the one or more processors are configured to assign a portion of the ML graph to the CPU and another portion of the ML graph to the ML computational engine.

In some embodiments, the one or more processors are configured to produce, for the subgraph, an updated work plan corresponding to an updated range of shapes different from the selected range of shapes, and to process subsequent input tensors whose shapes belong to the updated range of shapes using the updated work plan. In other embodiments, the updated range of shapes includes a refined range of shapes in which at least one dimension has a refined range of sizes smaller than a range of sizes of that dimension in the selected range of shapes. In yet another embodiment, the one or more processors are configured to decide whether to further refine the refined range of shapes based on one or both of (i) shapes of multiple received input tensors that belong to the refined range of shapes, and (ii) an improvement in execution time of the subgraph using the updated work plan exceeding a predefined improvement threshold.

In an embodiment, the one or more processors are configured to identify that a given dimension in the actual shape exceeds a corresponding size in the selected range of shapes, to determine the updated range of shapes so as to contain the actual shape, and to process the input tensor using a work plan corresponding to the updated range of shapes.

There is additionally provided, in accordance with an embodiment that is described herein, a method, including, receiving by one or more processors, a work plan associated with a subgraph of a ML graph of a Machine Learning (ML) model, the work plan supports processing of tensors having respective shapes in a selected range of shapes, and a shape of a tensor specifies respective sizes of dimensions of that tensor. An input tensor having an actual shape is received. Based on the actual shape, the work plan is modified to produce a modified work plan for processing the input tensor in accordance with the subgraph. The input tensor is processed in accordance with the subgraph, by submitting the modified work plan for execution by one or more of the processors.

These and other embodiments will be more fully understood from the following detailed description of the embodiments thereof, taken together with the drawings in which:

DETAILED DESCRIPTION OF EMBODIMENTS

Overview

Figure 1:
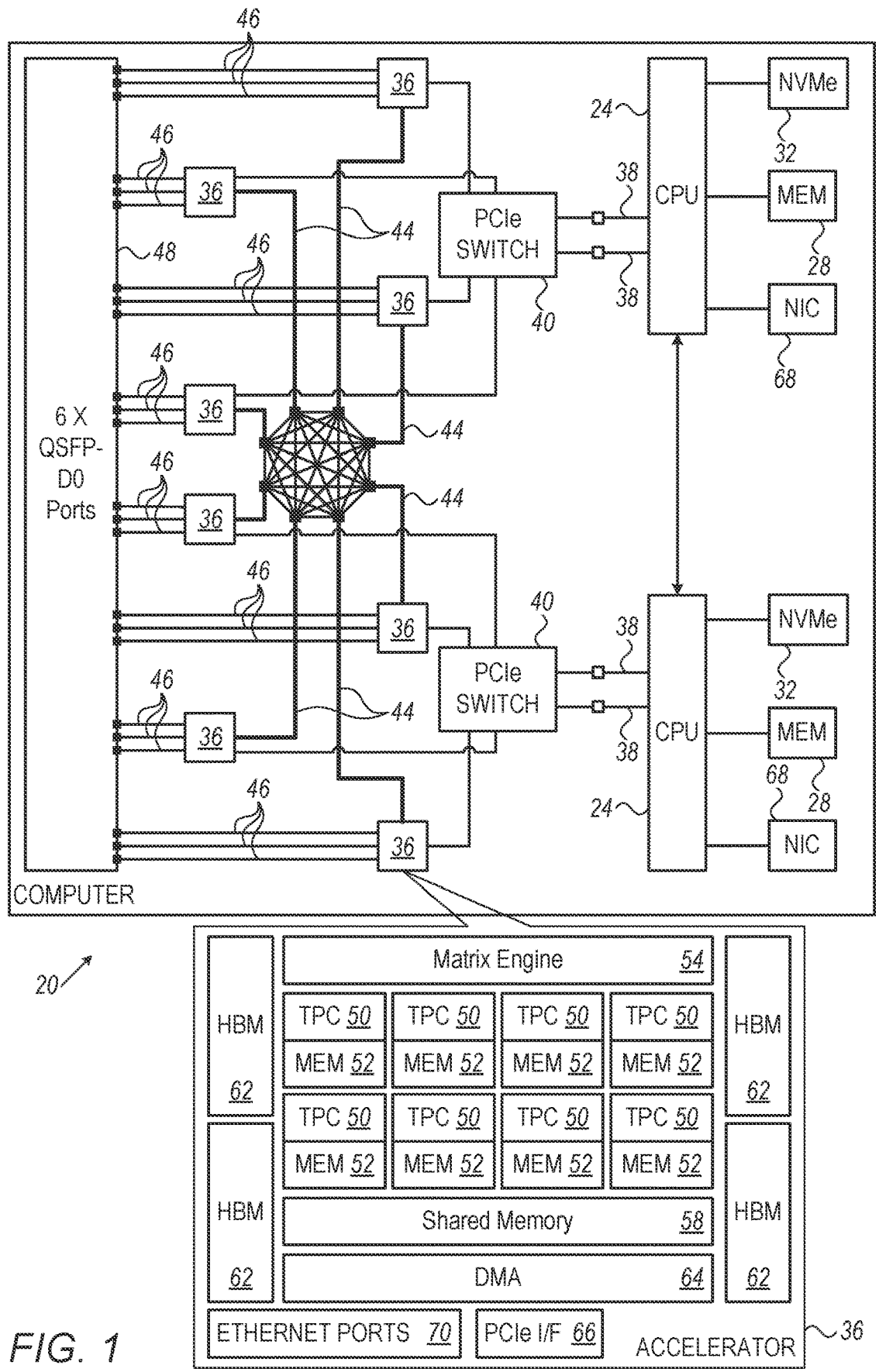
FIG. 1 is a block diagram that schematically illustrates a computer that supports Machine Learning (ML) with variable-shape tensors, in accordance with an embodiment that is described herein.

Embodiments that are described herein provide improved methods and systems for Machine Learning (ML) processing with tensors having variable shapes.

In various ML applications a ML model is represented by a ML graph comprising nodes and edges. The nodes represent computational and other operations of the ML model, and the edges interconnect among the nodes in accordance with the ML model. Each individual node typically supports one or more primitive operations. The edges interconnecting the nodes determine the data flow across the ML graph. A system based on a ML model "learns" to perform a task by considering samples, generally without explicitly programming the system to perform the task.

In a ML graph, the nodes, edges, or both are typically assigned corresponding weights. The process of running a ML model over a large dataset of samples for determining the weights of the corresponding graph is referred to as a "training" process. The process of performing an intended task to an input sample using the trained model is referred to as an "inference" process. In the present context, running or executing a ML model means executing the corresponding ML graph.

Running a ML model typically involves execution in the nodes billions of operations of various types. For increasing the performance, e.g., in terms of speed and throughput, the execution of the underlying ML graph may be carried out using accelerators comprising dedicated computational engines designed for performing ML-related operations efficiently.

Operations in the ML graph are typically applied to data structures that are referred to as "tensors." A tensor may be considered as a multi-dimensional array. A tensor may comprise a scalar, a one-dimensional (1D) vector, a two-dimensional (2D) matrix, or a multi-dimensional matrix with a number of dimensions higher than two. Different dimensions of a given tensor may have different sizes. For example, a matrix representing an image may have different numbers of pixels in the height and width dimensions. In the present context and in the claims, the term "shape" attributed to a tensor refers to the sizes of the respective dimensions of that tensor. The shape of a tensor can thus include a 1D vector of the dimension-sizes. For example, the shape of a tensor that includes a 200-by-100 matrix may be given by the shape vector [200, 100].

Some ML applications involve tensors having variable shapes. This may occur, for example, when input tensors to be processed may have different shapes. As another example, a ML graph may contain a tensor operation for which the shape of output tensor depends on the actual value of the tensor or tensors to which this operation is applied, e.g., a "UNIQUE" operation. Operations in the ML graph that receive or produce tensors of variable shapes can be resolved at run time when actual tensors become available.

In principle, a ML graph that contains variable-shape tensors can be processed by evaluating for each operation in the ML graph the exact input and output shapes for actual tensors. In this case, execution of the full ML graph is carried out as a sequence of individual operations. This approach is typically inefficient because graph level optimizations such as improved memory utilization, scheduling, and pipeline execution in multiple computational engines cannot be applied.

Another approach to handle variable-shape tensors could be to pad the tensors to the maximal supported sizes in all the dimensions. Padding, however, is typically cumbersome because the different operations may require different types of padding, e.g., depending on semantics of the underlying operations used. Moreover, the padding type may be unknown, e.g., for user-defined operations.

In the disclosed embodiments, a work plan that supports multiple shapes (e.g., a range of shapes) is first produced. Such a work plan is compiled as a modifiable work plan, e.g., by including in that work plan one or more place holders specifying ranges of shapes, to be later filled or replaced with actual shapes. At run time, the work plan is modified, to produce a modified executable work plan based on the actual shapes of input and intermediate tensors. In general, a work plan typically specifies multiple jobs required for executing at least a subgraph of the ML graph by computational engines.

In some embodiments, a subgraph has multiple subgraph inputs for receiving input tensors. A subgraph of this sort processes multiple input tensors received respectively via the subgraph inputs in each processing cycle or iteration. In such embodiments, the different subgraph inputs are associated with respective dedicated ranges of shapes.

Consider an apparatus for Machine Learning (ML) processing, comprising a memory and one or more processors. The memory is configured to store tensors for ML processing. The one or more processors are configured to receive a work plan associated with a subgraph of a ML graph of a ML model, wherein the work plan supports processing of tensors having respective shapes in a selected range of shapes, and wherein a shape of a tensor specifies respective sizes of dimensions of that tensor, and to receive an input tensor that was stored in the memory, the input tensor having an actual shape. Based on the actual shape, the one or more processors are configured to modify the work plan to produce a modified work plan for processing the input tensor in accordance with the subgraph, and to process the input tensor in accordance with the subgraph, by submitting the modified work plan for execution by one or more of the processors.

In some embodiments, the one or more processors are configured to receive multiple input tensors for processing using the work plan in a common processing cycle, the input tensors belong to respective ranges of shapes. In such embodiments, the one or more processors are configured to modify the work plan based on actual shapes of the respective input tensors for producing the modified work plan, and to processes the multiple input tensors in the common processing cycle using the modified work plan.

In an embodiment, the actual shape depends on a non-inferable tensor operation in a previously executed subgraph, wherein the non-inferable tensor operation generates a tensor whose shape depends on actual data in one or more tensors input to the non-inferable tensor operation.

The subgraph typically comprises one or more tensor operations, and the one or more processors are configured to produce the modified work plan by modifying a tensor operation in the subgraph that receives as input variable-shape tensors, so as to operate on an input tensor having the actual shape. In some embodiments, one of the processors comprises a ML computational engine that is assigned to execute at least part of the modified work plan.

In some embodiments, the one or more processors are configured to determine the selected range of shapes based on shapes of tensors received over multiple iterations of processing the subgraph. In some embodiments, it is inefficient to submit certain operations such as operations that manipulate shapes for execution by a ML computational engine. In such embodiments, the one or more processors comprise at least a Central Processing Unit (CPU) and a ML computational engine, and the one or more processors are configured to assign a portion of the ML graph to the CPU and another portion of the ML graph to the ML computational engine.

In some embodiments, the one or more processors start with an initial work plan that supports a large range of shapes. Then, in a background task, the one or more processors produce refined work plans corresponding to smaller ranges of shapes that are expected to execute faster than the initial work plan. Moreover, a refined work plan may be further refined, in an attempt to reduce execution time.

In some embodiments, the one or more processors are configured to produce, for the subgraph, an updated work plan corresponding to an updated range of shapes different from the selected range of shapes, and to process subsequent input tensors whose shapes belong to the updated range of shapes using the updated work plan.

In an embodiment, the updated range of shapes comprises a refined range of shapes in which at least one dimension has a refined range of sizes smaller than a range of sizes of that dimension in the selected range of shapes.

In some embodiments, the one or more processors are configured to decide whether to further refine the refined range of shapes based on one or both of (i) shapes of multiple received input tensors that belong to the refined range of shapes, and (i) an improvement in execution time of the subgraph using the updated work plan exceeding a predefined improvement threshold.

Although starting with a large range of shape, a tensor of a larger shape may be received, in which case the one or more processors produce a work plan for an increased range of shapes. Specifically, the one or more processors are configured to identify that a given dimension in the actual shape exceeds a corresponding size in the selected range of shapes, to determine the updated range of shapes so as to contain the actual shape, and to process the input tensor using a work plan corresponding to the updated range of shapes.

In the disclosed techniques, a ML graph or a subgraph thereof is compiled to produce a work plan that supports a range of shapes specified by ranges of sizes associated with respective dimensions of the tensors. At runtime, the work plan is modified based on actual tensor shapes, and the modified work plan is submitted for execution by one or more computational engines. Using a compiled work plan that is modifiable at run time to actual tensor shapes is much more efficient than re-compiling the ML graph for each shape separately. Moreover, additional modifiable work plans with improved performance for selected ranges of shapes may be created in the background, based on actual tensor statistics and execution times.

SYSTEM DESCRIPTION

FIG. 1 is a block diagram that schematically illustrates a computer 20 that supports Machine Learning (ML) with variable-shape tensors, in accordance with an embodiment that is described herein.

ML applications and services supported by computer 20 include, for example, image and gesture recognition in video, speech recognition, natural language processing and recommendation systems, to name a few.

In the present example, computer 20 comprises two host Central Processing Units (CPUs) 24, comprising any suitable processor. In some embodiments, CPU 24 comprises a multi-core processor comprising multiple processing cores. Each of CPUs 24 comprises a memory 28, e.g., a volatile memory, which may reside within or externally to the CPU. Each of CPUs 24 is further coupled to a Nonvolatile Memory (NVMe) 32.

The usage of multiple CPUs (e.g., two CPUs in this example) increases the ML processing throughput compared to using a single CPU. This configuration, however, is not mandatory, and in alternative configurations a single CPU or a number of CPUs higher than two can also be used.

Computer 20 comprises multiple accelerators 36 that are interconnected in an all-to-all connectivity configuration. In the present example, computer 20 comprises eight accelerators 36, each of which connects to multiple other accelerators. In FIG. 1, each accelerator connects to the other seven accelerators using a multi-link physical connection 44 comprising seven n links, e.g., Ethernet links.

In FIG. 1, CPUs 24 communicate with accelerators 36 using Peripheral Component Interconnect Express (PCIe) links 38. Specifically, each CPU 24 is coupled using a PCIe switch 40 to four accelerators 36.

In the present example, each accelerator is coupled using links 46 to Quad Small Form-Factor Pluggable (QSFP) transceiver modules 48. In the present example, computer 20 comprises six QSFP modules, i.e., a total number of 24 transceivers serving the eight accelerators. Using the QSFP transceivers, accelerators 36 can communicate directly with other accelerators residing externally to computer 20, e.g., for the purpose of scaling out the ML capabilities.

The lower part of FIG. 1 depicts a block diagram of an example accelerator 36.

Accelerator 36 comprises one or more computational engines of any suitable type, for performing efficiently various mathematical and logical operations. In the example of FIG. 1, accelerator 36 comprises eight Tensor Processor Cores (TPCs) 50, each of which having a local memory 52. Accelerator 36 further comprises a matrix engine 54.

In some embodiments, the computational engine, e.g., TPC 50, is designed for high performance deep learning. For example, the TPC can handle efficiently matrix arithmetic such as, for example, matrix multiplication and matrix addition operations. Moreover, the computational engine supports various floating point, integer, and unsigned integer data types. Matrix engine 54 supports various vector-matrix and matrix-matrix operations, including General Matrix Multiply (GEMM) operations of the form $C \leftarrow \alpha AB + \beta C$.

In some embodiments, accelerator 36 comprises an on-die shared memory 58 such as, for example, a Static RAM (SRAM). Moreover, the accelerator comprises multiple (four in this example) High Bandwidth Memory (HBM) devices 62, providing, e.g., 32 Giga Bytes of storage capacity and a bandwidth of 1 Tera Bytes per second. In an embodiment, accelerator 36 comprises a PCIe interface 66 for connecting to CPU 24 via PCIe switch 40, as described above.

In computer 20, each CPU 24 is coupled to a network adapter 68, e.g., a Network Interface Controller (NIC) 68 for connecting to any suitable communication network using suitable communication protocols (not shown). The communication network may comprise, for example, an Ethernet network with the Transmission Control Protocol (TCP) or the User Datagram Protocol (UDP) transport layer.

In some embodiments, accelerator 36 comprises one or more on-chip RDMA over Converged Ethernet (RoCE) engines. The ROCE engines are important, e.g., for inter-accelerator communication during the processing (e.g., training) of a ML model. RDMA operations are supported by the accelerator using Direct Memory Access (DMA) 64. In some embodiments, using RDMA, NICs 68 retrieve samples from a remote storage, and transfer the retrieved samples directly to shared memory 58 without involving CPUs 24.

Accelerator 36 comprises multiple Ethernet ports 70, for connecting to QSFP transceivers 48 using links 46, as described above. For example, the accelerator may comprise ten Ethernet ports (70) of 100 Gbit/second Ethernet per port, in an embodiment. Alternatively, other numbers of ports operating at other suitable data rates can also be used. Ports 70 are designed to scale out the inter-accelerator communication by integrating a complete communication engine on-die (e.g., ROCE engines as described above).

The computer (20) and accelerator (36) configurations shown in FIG. 1 are example configurations, which are chosen purely for the sake of conceptual clarity. In alternative embodiments, any other computer and accelerator configurations can also be used. Elements that are not necessary for understanding the principles of the present invention, such as various interfaces, addressing circuits, timing and sequencing circuits and debugging circuits, have been omitted from the figure for clarity.

Some elements of accelerator 36, such as TPCs 50 and matrix engine 54, may be implemented in hardware, e.g., in one or more Application-Specific Integrated Circuits (ASICs) or FPGAS. Additionally or alternatively, accelerator 36 can be implemented using software, or using a combination of hardware and software elements.

Memory 28 may comprise any suitable memory, e.g., a Random-Access Memory (RAM) such as, for example, a suitable Double Data Rate Synchronous Dynamic (DDR SDRAM) memory. Memory 32 may comprise any suitable nonvolatile type of memory, such as, for example, a Flash memory.

In some embodiments, some of the functions of computer 20, e.g., functions of CPU 24 and accelerator 36, may be carried out by general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Processing Ml Graphs Having Variable-Shape Tensors

Figure 2:
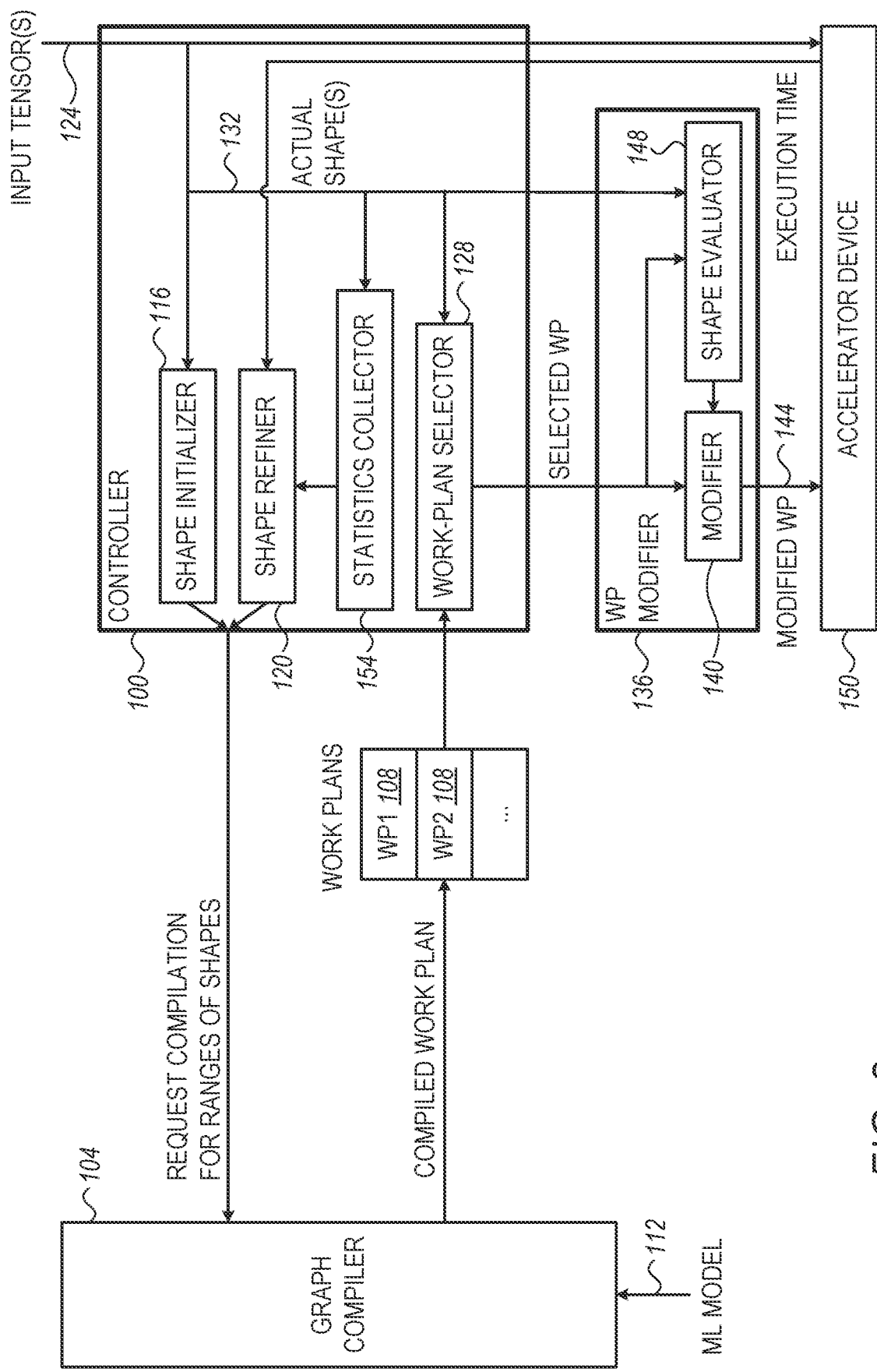
FIG. 2 is a block diagram that schematically illustrates elements used in processing of a ML graph that contains variable-shape tensors, in accordance with an embodiment that is described herein.

FIG. 2 is a block diagram that schematically illustrates elements used in processing of a ML graph that contains variable-shape tensors, in accordance with an embodiment that is described herein.

In some embodiments, at least some of the elements in FIG. 2 are executed in software, e.g., using a CPU 24. Such elements may include, for example, controller 100, graph compiler 104 and work-plan modifier 136 that will be described below.

In FIG. 2, a controller 100 requests a graph compiler 104 to produce a modifiable work plan 108 for execution of a ML subgraph of a ML graph corresponding to a ML model 112. For supporting variable-shape tensors, the controller requests the compiler to produce a modifiable work plan for one or more ranges of tensor shapes. Each of the ranges of shapes corresponds to tensors received by a respective subgraph input. The requested ranges of shapes may be determined by a shape initializer 116 or by a shape refiner 120, as will be described below. In response to the request, the compiler produces a modifiable work plan that supports the requested ranges of shapes by including in the modifiable work plan suitable preparation operations (e.g., include in the work plan place holders for variable shapes) that can later be used for modifying the modifiable work plan for executing the subgraph using a tensor whose shape belongs to the requested range of shapes.

When a process (e.g., training or inference) of a ML graph or subgraph starts, shape initializer 116 selects for each subgraph input an initial range of tensor shapes, e.g., in accordance with an expected range of tensor shapes. In the context of the present application and in the claims, the term "range of shapes" refers to multiple shapes for which at least one of the tensor dimensions is specified in a selected range of dimension sizes. Tensors that belong to a given range of shapes have a common number of dimensions.

The controller requests the compiler to produce an initial modifiable work plan that supports the initial ranges of shapes, e.g., a work plan denoted WP1 in the figure. When receiving a subsequent tensor whose shape is outside the respective initial range of shapes, the initializer determines a suitable extended range of shapes, and causes the controller to request the graph compiler to produce a modifiable work plan for the extended range of shapes. Shape refiner 120 may cause the controller to request the compiler to produce for the subgraph one or more additional modifiable work plans 108 (e.g., denoted WP2) having refined ranges of shapes, as will be described in detail below.

When receiving one or more input tensors 124 in a given processing cycle of the subgraph, a work-plan selector 128 selects one of modifiable work plans 108, based on actual shapes 132 of the received tensors. A work-plan modifier 136 comprises a modifier 140 that modifies the selected modifiable work plan to produce a modified work plan 144. Based on the actual tensor shapes, a shape evaluator 148 determines the actual shapes at the inputs and outputs of respective variable-shape operations in the subgraph, to be used by modifier 140 in producing the modified work plan.

In some embodiments, modifying a modifiable work plan is based on the shape analysis propagation carried out by shape evaluator 148 to identify in the modifiable work plan place holders for variable shapes, and actual shapes to be used. Modifier 140 updates the identified place holders so as to produce a modified work plan adapted to the actual shapes in the present processing cycle of the subgraph. As an example, consider a node in the subgraph that includes a DMA engine for moving a required amount of data between memory regions. Further assume a modifiable work plan that supports a range of data sizes for the DMA engine between 2 and 40 Megabytes. The range of shapes in this example is 2-40 Megabytes. When executing the subgraph, the actual data size (or shape) may be 20 Megabytes, and modifier 140 modifies the modifiable work plan to create a modified work plan in which the DMA engine moves the actual data size of 20 Megabytes.

An accelerator device 150 receives tensor(s) 124 and modified work plan 144 and applies the modified work plan to tensor(s) 124, in the present processing cycle of the subgraph. Accelerator device 150 may implement accelerator 36 of FIG. 1 above.

During training or inference, a statistics collector 154 collects statistical information on the shapes of received tensors 124. Shape refiner 120 the uses statistical information to select refined shape ranges that may be used for producing modifiable work plans that result in improved execution time in the accelerator device, as will be described in detail below. Shape refiner 120 triggers graph compiler 104 to compile modified work plans for the refined ranges of shapes it produces.

Identifying Operations Related to Variable-Shape Tensors

Figure 3:
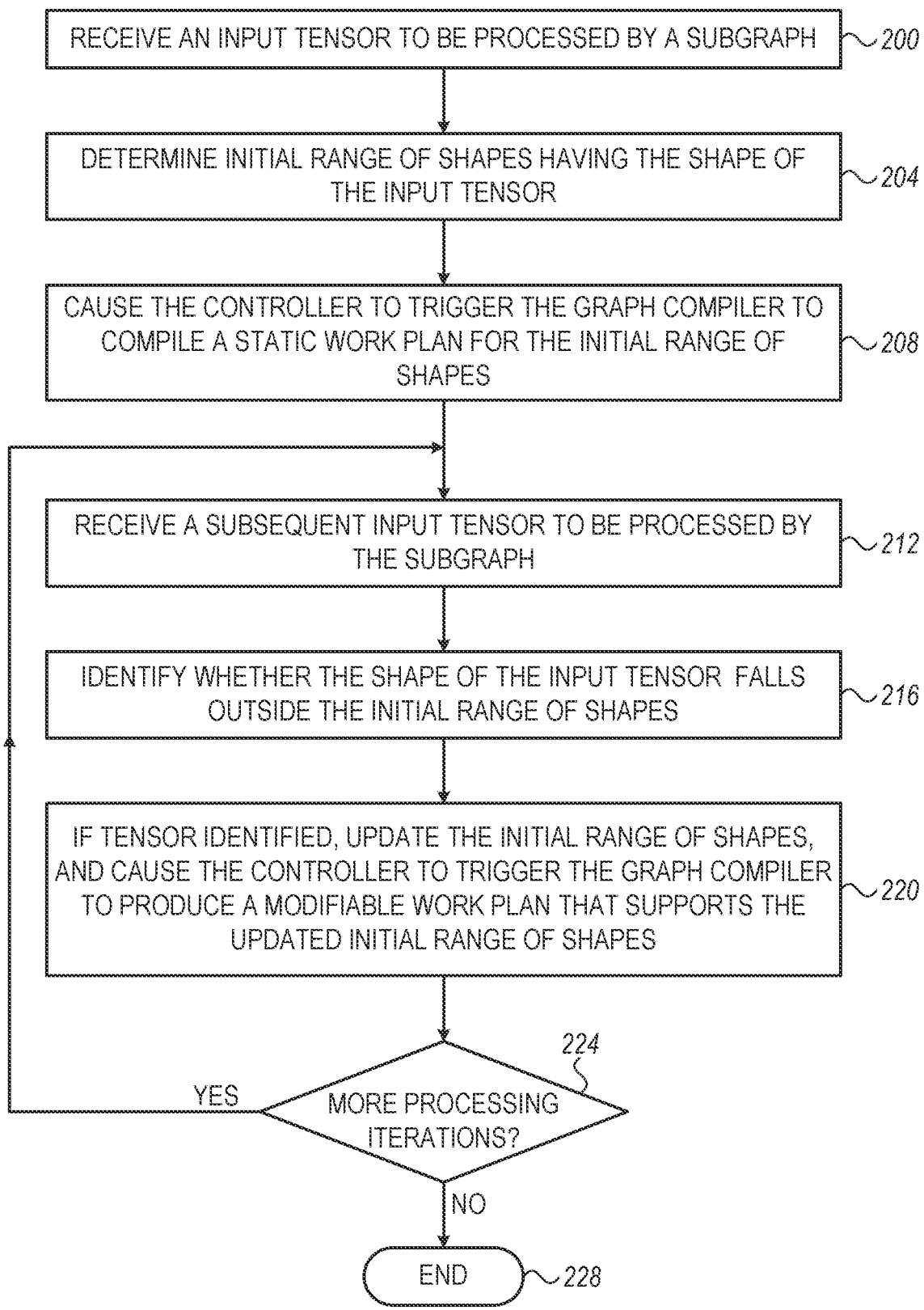
FIG. 3 is a flow chart that schematically illustrates a method for identifying in a ML graph or a subgraph, operations that receive or produce tensors having variable shapes, in accordance with an embodiment that is described herein.

FIG. 3 is a flow chart that schematically illustrates a method for identifying in a ML graph or a subgraph, operations that receive or produce tensors having variable shapes, in accordance with an embodiment that is described herein.

The method will be described as executed by shape initializer 116 of controller 100 of FIG. 2. The method will be described for a subgraph of a ML graph, but is similarly applicable to a ML graph.

In describing the method, it is assumed that the subgraph has a single subgraph input for receiving input tensors.

The method begins with shape initializer 104 receiving an input tensor 124 to be processed by the subgraph, at a tensor reception step 200. In some embodiments, as depicted in FIG. 2, the shape initializer receives the shapes (132) of input tensors 124. At an initialization step 204, the shape initializer determines an initial range of shapes having the shape of the input tensor. The initial range of shapes of step 104 is degenerated, in the sense that it contains a single size in each of the tensor dimensions. At a static work plan production step 208, the shape initializer causes the controller to trigger the graph compiler to compile a static work plan for the initial range of shapes of step 204. At this point, the controller supports processing subsequent input tensors having the same shape of the input tensor of step 100, using the static work plan.

At a subsequent reception step 212, the shape initializer receives a subsequent input tensor to be processed by the subgraph (in another processing cycle), and at an identification step 216, identifies whether the shape of the input tensor falls outside the initial range of shapes. At a range updating step 220, the shape initializer checks whether the tensor was identified, and if so, updates the initial range of shapes, and causes the controller to trigger the graph compiler to produce a modifiable work plan that supports the updated initial range of shapes. At this point, the controller supports processing input tensors (received via the relevant subgraph input) whose shapes fall within the updated range of shapes.

At a loop management step 224, the shape initializer checks whether there are more processing iterations to run, and if so, loops back to step 212 to receive subsequent one or more input tensors. Otherwise, the method terminates at an ending step 228.

At step 220 above, the shape initializer may select the initial range of shapes using any suitable method. The purpose is to select a range of shapes that is sufficiently large for the tensors expected to be processed, with high probability. In one embodiment, the shape initializer selects the range of shapes to the largest sizes of dimensions in the input tensors received so far via the subgraph input in question. In another embodiment, the shape initializer extends the range of shapes to be larger than the maximal sizes of dimensions received so far via the subgraph input in question. For example, set the maximal sizes of the variable-size dimensions to K times the sizes of the variable-size dimensions of the input tensors received so far via the relevant subgraph input. The factor K may be any suitable number larger than 1, e.g., K=2.0. In this embodiment, the minimal sizes of the variable-size dimensions may be selected as a common minimal size expected.

Methods for Processing ML Graphs Having Variable-Shape Tensors

Figure 4:
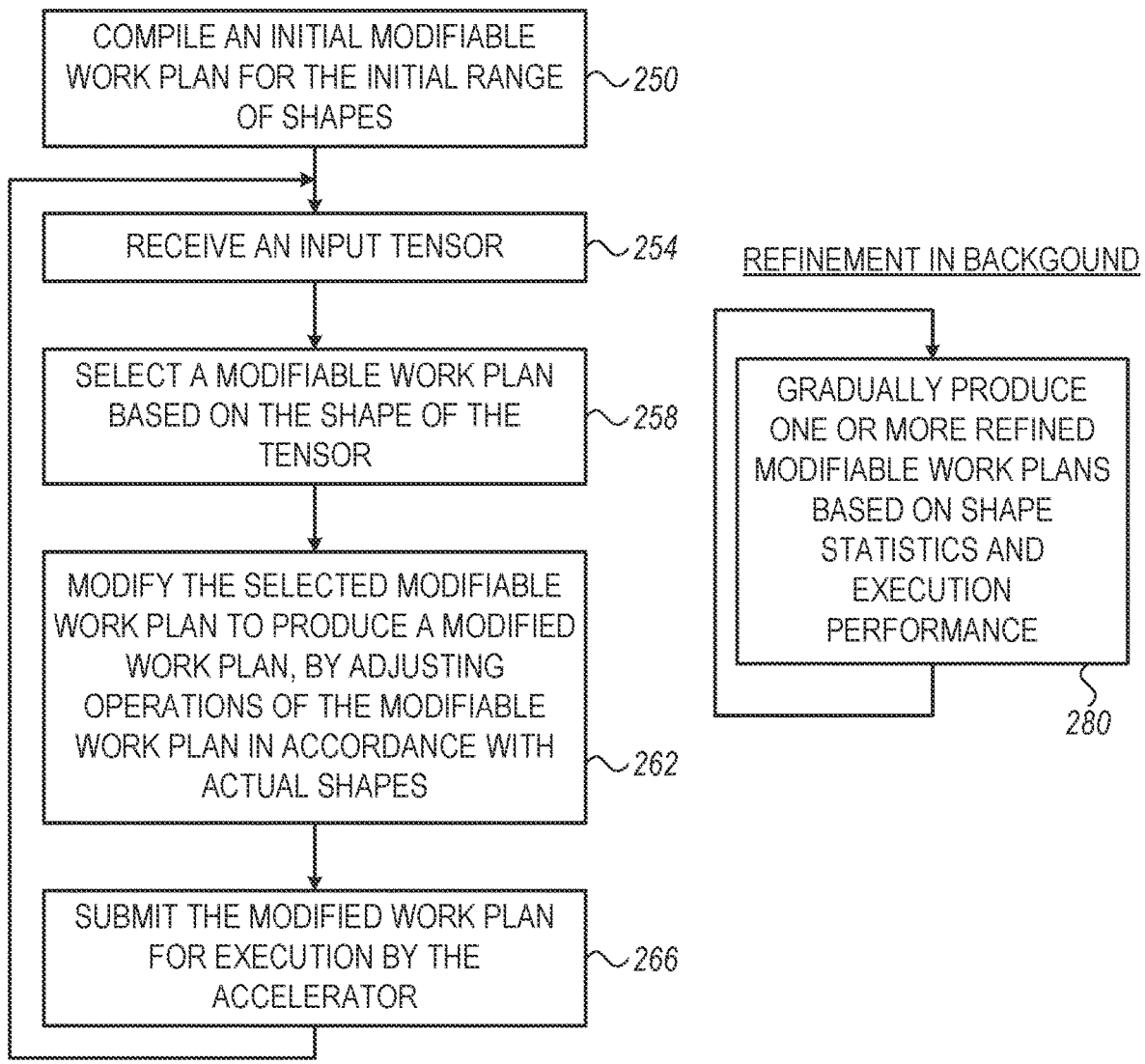
FIG. 4 is a flow chart that schematically illustrates a method for processing a subgraph having operations that receive or produce variable-shape tensors, in accordance with an embodiment that is described herein.

FIG. 4 is a flow chart that schematically illustrates a method for processing a subgraph having operations that receive or produce variable-shape tensors, in accordance with an embodiment that is described herein.

The method will be described as executed by controller 100 of FIG. 2.

In performing the method of FIG. 4 it is assumed that controller 100 holds an initial range of shapes, determined using any suitable method, e.g., the method of FIG. 3.

The method begins with controller 100 requesting graph compiler 104 to produce an initial modifiable work plan based on the initial range of shapes, at an initial work plan producing step 250. At a reception step 254, the controller receives a tensor to be processed in accordance with the subgraph in question. At a work-plan selection step 258, the controller selects (e.g., using work-plan selector 128) a modifiable work plan previously produced by the graph compiler. Until statistics collector 154 gathers sufficient statistics on the shapes of received tensors to perform refinement, the controller selects the initial modifiable work plan, which is the only one available. After producing one or more refined modifiable work plans, e.g., using shape refiner 120, the controller may select a modifiable work plan for a refined range of shapes smaller than the initial range of shapes.

At a work plan modification step 262, the controller modifies the modifiable work plan selected at step 258, to produce a modified work plan. To this end, the controller adjusts the operations of the modifiable work plan in accordance with actual shapes derived from the tensor received at step 254. At a submission step 266, the controller submits the modified work plan to accelerator 150 (or 36) for execution.

Following step 266 the method loops back to step 254 to receive a subsequent tensor.

In parallel to the loop carried out by steps 254-266 above, the controller performs shape refinement, at a refinement step 280 as a background task. To this end, at step 280, the controller gradually produces one or more refined modifiable work plans based on shape statistics and execution performance. A method for shape refinement will be now described with reference to FIG. 5. In some embodiments, the initial range of shapes may be extended to support larger dimension sizes, as described, for example, in the method of FIG. 3.

For the sake of clarity, the methods of FIGS. 3 and 4 were described for a subgraph that has a single subgraph input for receiving variable-shape tensors. In alternative embodiments, a subgraph typically supports multiple subgraph inputs, for receiving multiple respective input tensors for processing in a common processing cycle of the subgraph. In such embodiments, the multiple subgraph inputs are associated with multiple respective ranges of shapes that are typically all used in selecting and compiling modifiable work plans.

Figure 5:
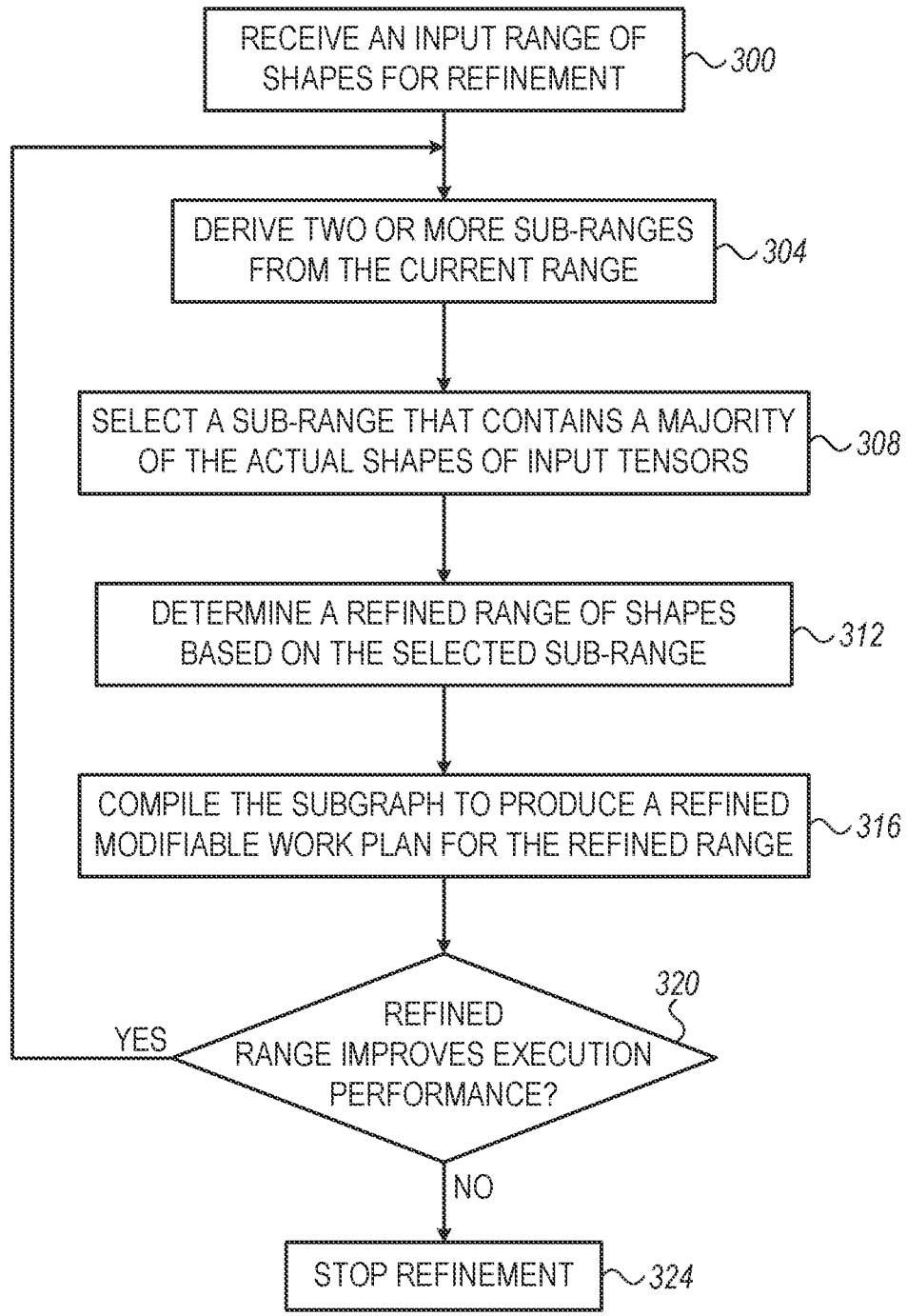
FIG. 5 is a flow chart that schematically illustrates a method for shape refinement, in accordance with an embodiment that is described herein.

FIG. 5 is a flow chart that schematically illustrates a method for shape refinement, in accordance with an embodiment that is described herein. The method will be described as executed by shape refiner 120 of FIG. 2. The method of FIG. 5 may be used in implementing step 280 of the method in FIG. 4 above.

The method begins with shape refiner 120 of FIG. 2 receiving a range of shapes for refinement, at a range reception step 300. The received range of shapes may comprise, for example, an initial range of shapes determined at step 250 of the method in FIG. 4. Alternatively, the received range of shapes may be a refined range of shapes derived from the initial or from another refined range of shapes. At a range splitting step 304, the shape refiner derives from the current range of shapes two or more sub-ranges. In some embodiments, the sub-ranges differ from the received range of shapes, in only one of the dimensions. In an embodiment, the shape refiner derives two sub-ranges by splitting the current range of shapes by half (or approximately by half) along one or more selected dimensions having a variable size. In another embodiment, the shape refiner splits the range of shapes into a number of sub-ranges larger than two and/or into two or more sub-ranges of different sizes.

At a sub-range selection step 308, the shape refiner selects one of the derived sub-ranges in accordance with a suitable selection criterion. For example, in some embodiments, the shape refiner receives (e.g., from statistics collector 154) counts of input tensors whose shapes belong to the respective sub-ranges. After receiving a number of tensors larger than a predefined number threshold, and when detecting that a majority of the shapes (e.g., more than 75%) fall in one of the sub-ranges, the shape refiner selects that sub-range for refinement.

At a range refinement step 312, the shape refiner determines a refined range of shapes based on the sub-range selected at step 308. At a refined work plan production step 316, the shape refiner causes controller 100 to trigger the graph compiler to produce a refined modifiable work plan for the refined range of shapes of step 312. Controller 100 will process subsequent input tenors having respective shapes in the refined range of shapes using the refined modifiable work plan of step 316.

At a performance evaluation step 320, the shape refiner checks whether using the refined modifiable work plan of step 316 improves performance (in terms of execution time), and if so, loops back to step 304 to perform another refinement process. Otherwise, the shape refiner does not further refine the recently refined sub-range, at a refinement conclusion step 324.

A modified work plan produced from a refined modifiable work plan (based on the selected sub-range) is typically expected to execute faster than a modifiable work plan of a range of shapes from which it was derived. In some embodiments, at step 320 above, shape refiner 120 continues to split the refined range of shapes, when detecting that the average execution time of the underline subgraph using the refined modifiable work plan has reduced by a predefined percentage.

In some embodiments, at step 320, the shape refiner measures or receives execution times of the modified work plan corresponding to the refined sub-range, and compares the execution times to those of the modified work plan of the original range of shapes from which the sub-range was derived. In some embodiments, the shape refiner uses for the comparison tensors processed by the modified work plan of the original range of shapes, that fall within the refined range of shapes. When detecting that the average execution time improves by less than a predefined threshold (e.g., less than 3%), the shape refiner refrains from further refining the sub-range (step 324 above). Otherwise, the improvement in execution time exceeds the threshold, and the shape refiner continues to refine the sub-range by looping back to step 304, as described above.

Figure 6:
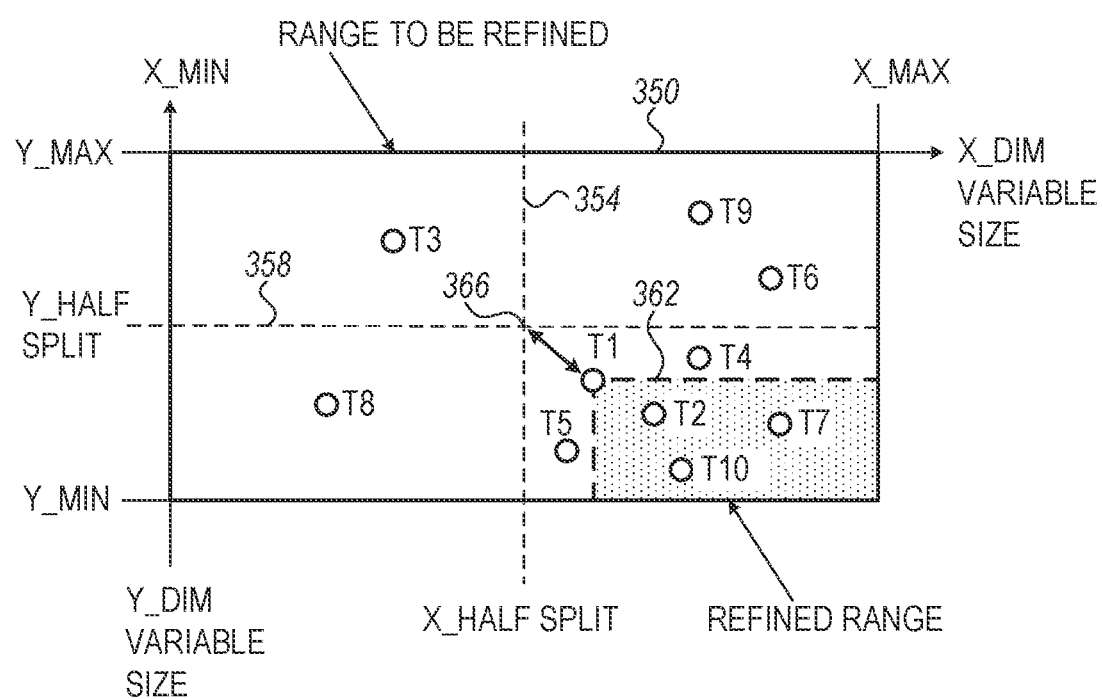
FIG. 6 is a diagram that schematically illustrates a refinement process of a range of shapes, in accordance with an embodiment that is described herein.

FIG. 6 is a diagram that schematically illustrates a refinement process of a range of shapes, in accordance with an embodiment that is described herein.

FIG. 6 depicts a range of shapes 350 having an X dimension and a Y dimension. Range of shapes 350 thus contains ranges of sizes, along the respective X and Y dimensions. This range of shapes may be used, for example, for tensors representing two-dimensional matrices. The range of shapes in FIG. 6 spans between dimension sizes X_MIN and X_MAX along the X dimension, and between dimension sizes Y_MIN and Y_MAX along the Y dimension.

In the present example, to refine range of shapes 350, shape refiner 120 splits the range of shapes in each of the X and Y dimensions by half, as depicted by respective vertical and horizontal dotted lines 354 and 358. The split in the X and Y dimensions divides range of shapes 350 into four quadrants.

Points denoted T1 . . . T10 in FIG. 6 correspond to ten respective tensors whose shapes belong to range of shapes 350. As seen in the figure, the shapes of most of these ten tensors fall within the lower right quadrant. Consequently, the shape refiner selects the lower right quadrant as the refined range of shapes, depicted as a colored rectangle 362.

In the present example, the sizes in the X and Y dimensions are the same as the original X_MAX and Y_MIN sizes. In some embodiments, to determine the minimal X and maximal Y sizes of the refined range of shapes, the shape refiner identifies the tensor in the lower right quadrant whose shape is closest to the intersection point 366 of the vertical horizontal dotted lines. In the present example, the tensor whose shape is closest to intersection point 366 tensor is denoted T1. The shape refiner then uses sizes of this tensor in the X and Y dimensions as the minimal X size and the maximal Y seize of the refined range of shapes. In some embodiments, refiner 120 may further refine the refined range of shapes 362, as described above.

In the example of FIG. 6, the refined range of shapes belongs to the right lower quadrant. In other embodiments, the refined range of shapes may belong to another quadrant, depending on the distribution of the shapes of subsequent tensors received.

Figure 7B:
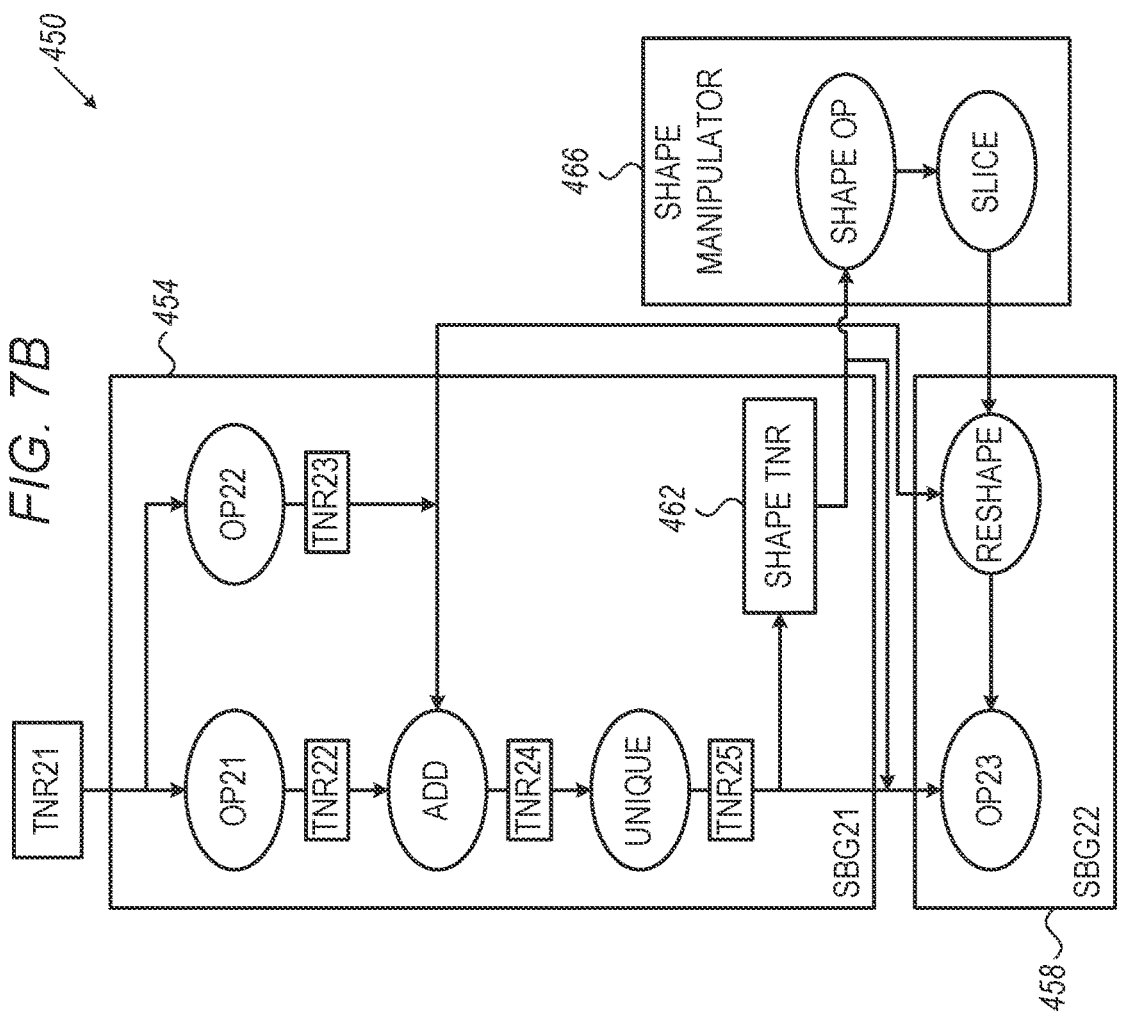
FIGS. 7A and 7B are diagrams that schematically illustrate ML graphs having operations whose output tensors have variable shapes, in accordance with embodiments that are described herein.
Figure 7A:
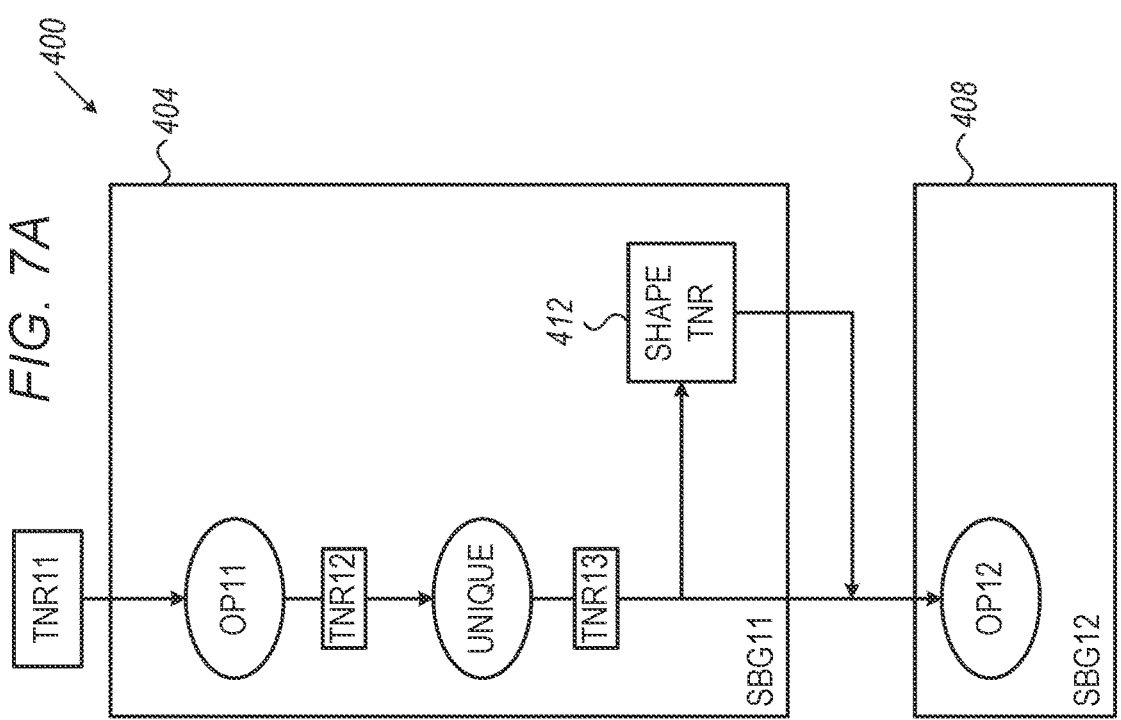

FIGS. 7A and 7B are diagrams that schematically illustrate ML graphs having operations whose output tensors have variable shapes, in accordance with embodiments that are described herein.

In FIGS. 7A and 7B, processing tensors in accordance with a ML graph will be described as is carried out by a CPU 24.

FIG. 7A depicts a ML graph 400. In the present example, ML graph 400 contains an operation denoted OP11 that receives an input tensor denoted TNR11 and outputs a tensor denoted TNR12. The ML graph contains a "UNIQUE" operation that receives TNR12 as input and outputs a tensor denoted TNR13 whose shape depends on the actual data contained in TNR12. An operation OP12 of the ML graph receives tensor TNR13 that has a variable shape.

In some embodiments, in compiling ML graph 400, the graph compiler (e.g., 104) splits ML graph 400 into a subgraph 404 denoted SBG11, followed by a subgraph 408 denoted SBG12, so that the variable-shape tensor TNR13 serves as input to operation OP12 in SBG12. Since OP12 may receive tensors of variable shapes, the graph compiler compiles SBG12 to produce a modifiable work plan that supports a suitable range of shapes.

In some embodiments, when compiling SBG11, the graph compiler includes in the work plan of SBG11 an operation that extracts the shape of TNR13 to produce a tensor shape 412. Consequently, when the execution of the work plan of SBG11 concludes, the actual shape of TNR13 becomes available, and may be used for modifying the modifiable work plan of SBG12, so that OP12 is adapted to receive input tensor TNR13 having the actual shape of TNR13.

FIG. 7B depicts a ML graph 450. In the present example, ML graph 450 contains operations denoted OP21 and OP22 that both receive an input tensor denoted TNR21. OP21 outputs a tensor denoted TNR22 and OP22 outputs a tensor denoted TNR23. In the present example, an "ADD" operation sums TNR22 and TNR23 to produce a tensor denoted TNR24. A "UNIQUE" operation receives TNR24 as input and outputs a tensor TNR25 whose shape depends on the data contained in TNR24. An operation OP22 of the ML graph receives tensor TNR25 that has a variable shape.

In some embodiments, the graph compiler splits ML graph 450 into a subgraph 454 denoted SBG21, followed by a subgraph 458 denoted SBG22, so that the variable-shape tensor TNR25 serves as input to OP23 in SBG22. Since OP23 may receive tensors of variable shapes, the graph compiler (e.g., 102) is triggered to compile SBG22 to produce a modifiable work plan that supports a suitable range of shapes.

In some embodiments, when compiling SBG21, the graph compiler includes in the work plan of SBG21 an operation that extracts the shape of TNR25 to produce a shape tensor 462. Consequently, when the execution of the work plan of SBG21 concludes, the actual shape of TNR25 becomes available, and may be used for modifying the modifiable work plan of SBG22, so that OP23 is adapted to receive tensor TNR25 having the actual shape of TNR25.

In the example of FIG. 7B, ML graph 450 further contains operations for manipulating the shape of TNR23. In some embodiments, since shape-manipulation operations are applied to shape tensors typically comprise a one-dimensional small-sized vector, it is typically inefficient to submit such shape-manipulation operations for execution in the accelerator device (150 or 36). Instead, in an embodiment, such shape-manipulation operations may be executed by the CPU.

In the example of FIG. 7B, in splitting ML graph 450 into SBG21 and SBG22, the graph compiler further allocates shape operations into a shape manipulator 466 for execution by the CPU. In the present example, the shape manipulator applies to shape tensor 462 a shape operation followed by a "SLICE" operation. A "RESHAPE" operation in SBG22 receives the shape tensor output by the SLICE operation. The reshaped tensor output by the RESHAPE operation is input to OP23.

The ML graphs 400 and 450 above are given by way of example and other suitable ML graph having other suitable operations and that are split into other suitable subgraphs can also be used.

Figure 8:
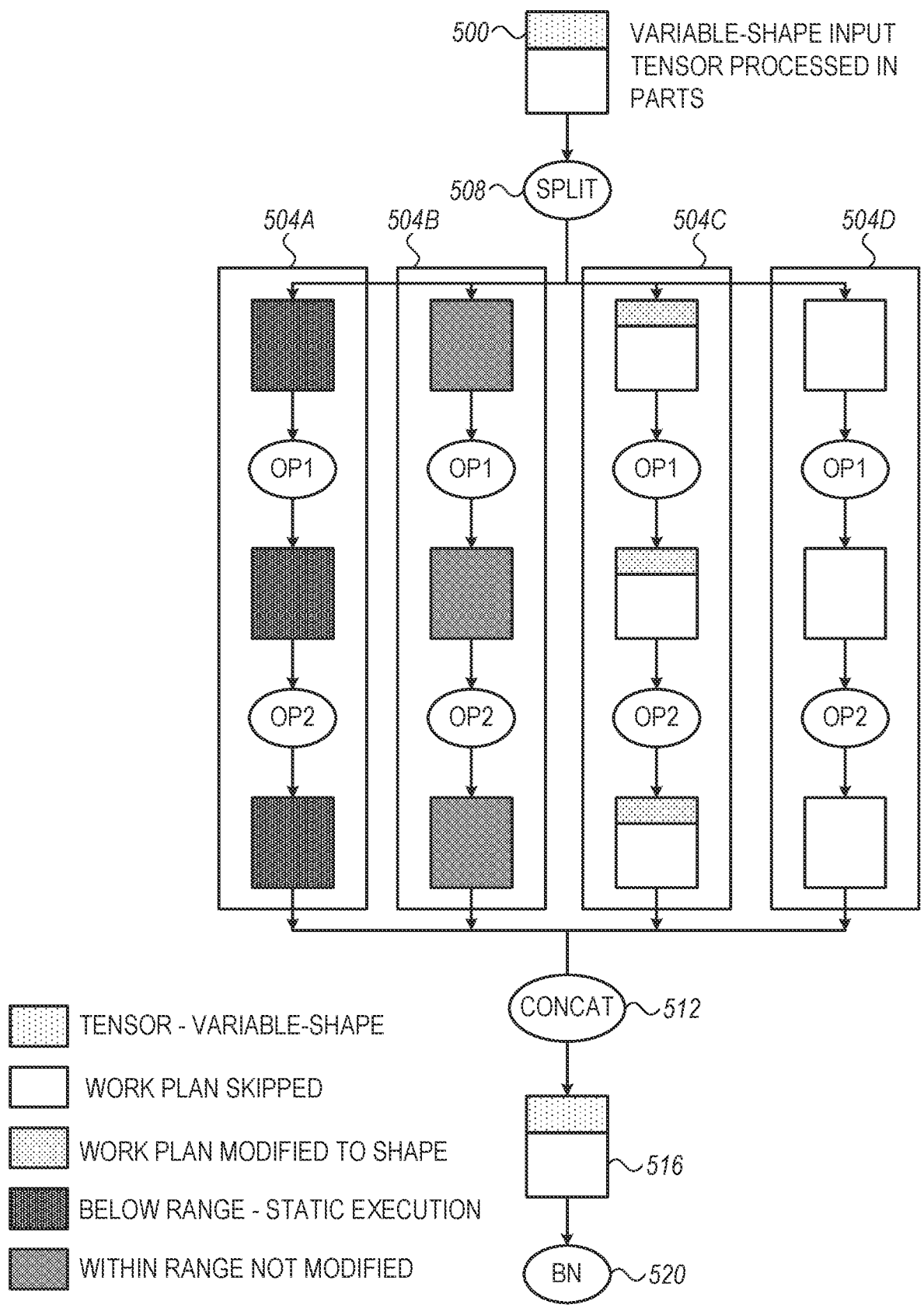
FIG. 8 is a diagram that schematically illustrates a method for processing a variable-shape tensor in parts, in accordance with an embodiment that is described herein.

FIG. 8 is a diagram that schematically illustrates a method for processing a variable-shape tensor in parts, in accordance with an embodiment that is described herein.

Processing a tensor in parts will be described as handled by graph compiler 104 of FIG. 2.

In FIG. 8, in the ML graph, processing a variable-size tensor 500 requires applying to the tensor a first operation denoted OP1 followed by a second operation denoted OP2. In the present example, graph compiler 104 processes tensor 500 in multiple (e.g., four) parts 504A . . . 504D. Operating in parts typically results in a work plan having shorter execution time compared to not working in parts.

To operate in parts, the graph compiler produces a work plan that splits tensor 500 in four, using a "SPLIT" operation 508. Each of the parts is then processed by applying to the relevant part OP1 followed by OP2. The processed parts are then concatenated using a "CONCATENATE" operation 512 to produce a processed tensor 516. In the present example, the processed tensor is also subjected to a BATCH-NORMALIZATION (BN) operation 520.

Assume, for example, that tensor 500 belongs to a range of sizes 1 . . . 1000 in one of the dimensions (denoted D'). Table 1 depicts size ranges handled by each of the four parts.

TABLE 1

| Example partitioning of a tensor into parts | |
|---|---|
| Part of tensor | Range of sizes of dimension D' |
| 504A | 1-250 |
| 504B | 251-500 |
| 504C | 501-750 |
| 504D | 750-1000 |

For tensors having respective sizes larger than 250 (in dimension D'), part 504A may have a non-modifiable part in the work plan used for a single tensor size of 250. This simplifies the production of that part of the work plan and shortens execution time of part 504A. In this example, the graph compiler produces a non-modifiable part in the work plan corresponding to a single size 250 in dimension D', and further produces a modifiable part of the work plan for the range 251-1000. The preparations in the modifiable part of the work plan corresponding to the respective parts 504B-504D may be needed or not, depending on the actual tensor received.

Consider, for example, an input tensor of a size 600 in dimension D'. In this case, the processing in the range 751-1000 is irrelevant, and the controller modifies the modifiable work plan of part 504D so as to omit the processing of part 540D. In the range 251-500, for a tensor of size 600 (in dimension D'), the controller submits the entire work plan for part 540B for execution. For the size 600, the controller further modifies part of the modifiable work plan corresponding to the range 501-750 of part 540C so as to process an actual size of 600.

In the embodiments described above, modifying a modifiable work plan is mainly carried out by a CPU (e.g., CPU 24 in FIG. 1). In other embodiments, this modification may be carried out, at least partly, by some other processor such as accelerator device 150 of FIG. 2.

Although the embodiments described herein mainly address variable-shape tensor processing in training and inference of ML models, the methods and systems described herein can also be used in other applications, such as in data augmentation applications.

It will be appreciated that the embodiments described above are cited by way of example, and that the following claims are not limited to what has been particularly shown and described hereinabove. Rather, the scope includes both combinations and sub-combinations of the various features described hereinabove, as variations and well as modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
a memory configured to store tensors for Machine Learning (ML) processing; and
one or more processors, configured to:
receive a work plan associated with a subgraph of a ML graph of a ML model, wherein the work plan supports processing of tensors having respective shapes in a selected range of shapes, and wherein a shape of a tensor specifies respective sizes of dimensions of that tensor;
receive an input tensor that was stored in the memory, the input tensor having an actual shape, wherein the actual shape depends on a non-inferable tensor operation in a previously executed subgraph, wherein the non-inferable tensor operation generates a tensor whose shape depends on actual data in one or more tensors input to the non-inferable tensor operation;
based on the actual shape, modify the work plan to produce a modified work plan for processing the input tensor in accordance with the subgraph; and
process the input tensor in accordance with the subgraph, by submitting the modified work plan for execution by one or more of the processors;
wherein at least one of the one or more processors comprises a ML computational engine that is assigned to execute at least part of the modified work plan.

2. The apparatus according to claim 1, wherein the one or more processors are configured to receive multiple input tensors for processing using the work plan in a common processing cycle, to modify the work plan based on actual shapes of the respective input tensors for producing the modified work plan, and to processes the multiple input tensors in the common processing cycle using the modified work plan, the input tensors belonging to respective ranges of shapes.

3. The apparatus according to claim 1, wherein the subgraph comprises one or more tensor operations, and wherein the one or more processors are configured to produce the modified work plan by modifying a tensor operation in the subgraph that receives as input variable-shape tensors, so as to operate on an input tensor having the actual shape.

4. The apparatus according to claim 1, wherein the one or more processors are configured to determine the selected range of shapes based on shapes of tensors received over multiple iterations of processing the subgraph.

5. The apparatus according to claim 1, wherein at least one of the one or more processors comprises a Central Processing Unit (CPU), and wherein the one or more processors are configured to assign a portion of the ML graph to the CPU and another portion of the ML graph to the ML computational engine.

6. The apparatus according to claim 1, wherein the one or more processors are configured to produce, for the subgraph, an updated work plan corresponding to an updated range of shapes different from the selected range of shapes, and to process subsequent input tensors whose shapes belong to the updated range of shapes using the updated work plan.

7. The apparatus according to claim 6, wherein the updated range of shapes comprises a refined range of shapes in which at least one dimension has a refined range of sizes smaller than a range of sizes of that dimension in the selected range of shapes.

8. The apparatus according to claim 7, wherein the one or more processors are configured to decide whether to further refine the refined range of shapes based on one or both of (i) shapes of multiple received input tensors that belong to the refined range of shapes, and (ii) an improvement in execution time of the subgraph using the updated work plan exceeding a predefined improvement threshold.

9. The apparatus according to claim 6, wherein the one or more processors are configured to identify that a given dimension in the actual shape exceeds a corresponding size in the selected range of shapes, to determine the updated range of shapes so as to contain the actual shape, and to process the input tensor using a work plan corresponding to the updated range of shapes.

10. A method, comprising:
receiving by one or more processors a work plan associated with a subgraph of a ML graph of a Machine Learning (ML) model, wherein the work plan supports processing of tensors having respective shapes in a selected range of shapes, and wherein a shape of a tensor specifies respective sizes of dimensions of that tensor;
receiving an input tensor having an actual shape, wherein the actual shape depends on a non-inferable tensor operation in a previously executed subgraph, wherein the non-inferable tensor operation generates a tensor whose shape depends on actual data in one or more tensors input to the non-inferable tensor operation;
based on the actual shape, modifying the work plan to produce a modified work plan for processing the input tensor in accordance with the subgraph; and
processing the input tensor in accordance with the subgraph, by submitting the modified work plan for execution by one or more of the processors;
wherein at least one of the one or more processors comprises a ML computational engine that is assigned to execute at least part of the modified work plan.

11. The method according to claim 10, and comprising receiving multiple input tensors for processing in a common processing cycle, the input tensors belonging to respective ranges of shapes, modifying the work plan based on actual shapes of the respective input tensors for producing the modified work plan, and processing the multiple input tensors in the common processing cycle using the modified work plan.

12. The method according to claim 10, wherein the subgraph comprises one or more tensor operations, and wherein producing the modified work plan comprises modifying a tensor operation in the subgraph that receives as input variable-shape tensors, so as to operate on an input tensor having the actual shape.

13. The method according to claim 10, and comprising determining the selected range of shapes based on shapes of tensors received over multiple iterations of processing the subgraph.

14. The method according to claim 10, wherein at least one of the one or more processors comprises a Central Processing Unit (CPU), the method further comprising assigning a portion of the ML graph to the CPU and another portion of the ML graph to the ML computational engine.

15. The method according to claim 10, wherein and comprising producing for the subgraph an updated work plan corresponding to an updated range of shapes different from the selected range of shapes, and processing subsequent input tensors whose shapes belong to the updated range of shapes using the updated work plan.

16. The method according to claim 15, wherein producing the updated range of shapes comprises producing a refined range of shapes in which at least one dimension has a refined range of sizes smaller than a range of sizes of that dimension in the selected range of shapes.

17. The method according to claim 16, wherein and comprising deciding whether to further refine the refined range of shapes based on one or both of (i) shapes of multiple received input tensors that belong to the refined range of shapes, and (ii) an improvement in execution time of the subgraph using the updated work plan exceeding a predefined improvement threshold.

18. The method according to claim 15, and comprising identifying that a given dimension in the actual shape exceeds a corresponding size in the selected range of shapes, determining the updated range of shapes so as to contain the actual shape, and processing the input tensor using a work plan corresponding to the updated range of shapes.

19. An apparatus, comprising:
a memory configured to store tensors for Machine Learning (ML) processing; and
one or more processors, at least one of the one or more processors comprising a ML computational engine, the one or more processors configured to:
  receive a work plan associated with a subgraph of a ML graph of a ML model, wherein the work plan supports processing of tensors having respective shapes in a selected range of shapes, and wherein a shape of a tensor specifies respective sizes of dimensions of that tensor;
  receive an input tensor that was stored in the memory, the input tensor having an actual shape;
  based on the actual shape, modify the work plan to produce a modified work plan for processing the input tensor in accordance with the subgraph; and
  process the input tensor in accordance with the subgraph, by submitting the modified work plan for execution by the ML computational engine;
  wherein the one or more processors are configured to produce, for the subgraph, an updated work plan corresponding to an updated range of shapes different from the selected range of shapes, and to process subsequent input tensors whose shapes belong to the updated range of shapes using the updated work plan.

20. The apparatus according to claim 19, wherein the updated range of shapes comprises a refined range of shapes in which at least one dimension has a refined range of sizes smaller than a range of sizes of that dimension in the selected range of shapes.

21. The apparatus according to claim 20, wherein the one or more processors are configured to decide whether to further refine the refined range of shapes based on one or both of (i) shapes of multiple received input tensors that belong to the refined range of shapes, and (ii) an improvement in execution time of the subgraph using the updated work plan exceeding a predefined improvement threshold.

22. The apparatus according to claim 19, wherein the one or more processors are configured to identify that a given dimension in the actual shape exceeds a corresponding size in the selected range of shapes, to determine the updated range of shapes so as to contain the actual shape, and to process the input tensor using a work plan corresponding to the updated range of shapes.

* * * * *